(12) United States Patent
Kumar et al.

(10) Patent No.: US 8,217,756 B2
(45) Date of Patent: Jul. 10, 2012

(54) RULE-BASED FILTERING AND ALERTING

(75) Inventors: Anush Kumar, Seattle, WA (US); Mohamed Fakrudeen Ali Ahmed, Tamil Nadu (IN); Balasubramanian Sriram, Sammamish, WA (US); Janaki Ram Goteti, Hyderabad (IN); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1625 days.

(21) Appl. No.: 11/192,877

(22) Filed: Jul. 29, 2005

(65) Prior Publication Data

US 2006/0047789 A1    Mar. 2, 2006

Related U.S. Application Data

(60) Provisional application No. 60/606,281, filed on Sep. 1, 2004, provisional application No. 60/606,577, filed on Sep. 2, 2004.

(51) Int. Cl.
| | |
|---|---|
| G05B 19/00 | (2006.01) |
| G05B 19/045 | (2006.01) |
| G05B 19/05 | (2006.01) |
| G08B 13/14 | (2006.01) |
| G06F 17/00 | (2006.01) |

(52) U.S. Cl. .................. 340/5.92; 340/572.4; 706/47

(58) Field of Classification Search ............... 340/5.92, 340/572.4; 706/47
See application file for complete search history.

(56) References Cited

U.S. PATENT DOCUMENTS

| | | | | |
|---|---|---|---|---|
| 4,975,865 | A | * | 12/1990 | Carrette et al. ............ 700/10 |
| 5,119,470 | A | * | 6/1992 | Highland et al. ............ 706/48 |
| 5,644,770 | A | * | 7/1997 | Burke et al. ............ 717/166 |
| 5,650,768 | A | | 7/1997 | Eswaran |
| 5,862,325 | A | | 1/1999 | Reed |
| 5,910,776 | A | | 6/1999 | Black |
| 5,949,335 | A | | 9/1999 | Maynard |
| 6,088,717 | A | | 7/2000 | Reed |
| 6,158,010 | A | | 12/2000 | Moriconi |
| 6,304,973 | B1 | | 10/2001 | Williams |
| 6,405,261 | B1 | | 6/2002 | Gaucher |
| 6,618,806 | B1 | | 9/2003 | Brown |

(Continued)

FOREIGN PATENT DOCUMENTS

EP    11632893    3/2006

(Continued)

OTHER PUBLICATIONS

Floerkemier, et al. "PML Core Specification 1.0" Sep. 13, 2003, Auto-ID Center, Version 1.0, 48 pages. Author Unknown, "Does Your Project Need a Rule Engine", Copyright 2008 Sys-Con Media, Downloaded Oct. 13, 2009 <http://java.sys-con.com/node/45082/print>.
Office Action dated Jan. 5, 2010 cited in U.S. Appl. No. 11/141,533.
Notice of Allowance dated Jan. 12, 2010 cited in U.S. Appl. No. 11/061,337.
U.S. Appl. No. 11/025,702, filed Feb. 18, 2005, Kumar, et al.
U.S. Appl. No. 11/061,337, filed Mar. 1, 2005, Kumar, et al.
U.S. Appl. No. 11/069,459, filed Feb. 18, 2005, Kumar, et al.
U.S. Appl. No. 11/061,356, filed May 31, 2005, Kumar, et al.
U.S. Appl. No. 11/141,619, filed May 31, 2005, Kumar, et al.
U.S. Appl. No. 11/140,726, filed May 31, 2005, Kumar, et al.
U.S. Appl. No. 11/141,533, filed May 31, 2005, Agarwal, et al.

(Continued)

*Primary Examiner* — Jennifer Mehmood
*Assistant Examiner* — Andrew Bee
(74) *Attorney, Agent, or Firm* — Workman Nydegger

(57) ABSTRACT

The claimed subject matter provides a system and/or a method that facilitates utilizing rule-based technology with radio frequency identification (RFID) network. An interface can receive real-time RFID data from a process comprising at least one device collection in the RFID network, wherein a rules engine (RE) component can employ a declarative event policy associated with the RFID network as rules. The RE allows dynamic updates of business logic associated with applications in real-time without the re-start and/or stop the applications. The system and/or method further comprises a vocabulary component that provides terms that defines at least one of the rule, rule condition, and action based at least in part upon an industry specific nomenclature.

4 Claims, 12 Drawing Sheets

U.S. PATENT DOCUMENTS

| | | | |
|---|---|---|---|
| 6,631,363 B1 | 10/2003 | Brown et al. | |
| 6,677,852 B1 | 1/2004 | Landt | |
| 6,732,923 B2 | 5/2004 | Otto | |
| 6,784,802 B1 | 8/2004 | Stanescu | |
| 6,873,260 B2 | 3/2005 | Lancos et al. | |
| 6,908,034 B2 | 6/2005 | Alleshouse | |
| 6,943,683 B2 | 9/2005 | Perret | |
| 7,155,305 B2 | 12/2006 | Hayes et al. | |
| 7,204,409 B2 | 4/2007 | Kumar et al. | |
| 7,257,108 B2 | 8/2007 | Cheston | |
| 7,267,275 B2 | 9/2007 | Cox et al. | |
| 7,290,708 B2 * | 11/2007 | Haller | 235/385 |
| 7,424,744 B1 | 9/2008 | Wu | |
| 7,426,484 B2 * | 9/2008 | Joyce et al. | 705/28 |
| 7,533,812 B2 | 5/2009 | Kumar | |
| 7,640,547 B2 | 12/2009 | Neiman | |
| 7,640,574 B1 | 12/2009 | Kim | |
| 7,701,341 B2 | 4/2010 | Kumar | |
| 7,756,747 B2 | 7/2010 | Agarwal et al. | |
| 7,756,969 B1 | 7/2010 | Clarke | |
| 2002/0004787 A1 * | 1/2002 | Moshal et al. | 705/80 |
| 2002/0059471 A1 | 5/2002 | Sanghvi et al. | |
| 2002/0070865 A1 | 6/2002 | Lancos et al. | |
| 2002/0095454 A1 | 7/2002 | Reed | |
| 2002/0143624 A1 | 10/2002 | Catan | |
| 2002/0170952 A1 | 11/2002 | Alsafadi et al. | |
| 2003/0061062 A1 * | 3/2003 | Tucker | 705/1 |
| 2003/0132853 A1 | 7/2003 | Ebert | |
| 2003/0135576 A1 | 7/2003 | Bodin | |
| 2003/0144926 A1 | 7/2003 | Bodin et al. | |
| 2003/0155413 A1 | 8/2003 | Kovesdi | |
| 2003/0225928 A1 | 12/2003 | Paul | |
| 2003/0227392 A1 | 12/2003 | Ebert et al. | |
| 2004/0016796 A1 | 1/2004 | Hanna | |
| 2004/0046642 A1 | 3/2004 | Becker et al. | |
| 2004/0070491 A1 | 4/2004 | Huang et al. | |
| 2004/0102995 A1 * | 5/2004 | Boppana | 705/1 |
| 2004/0111335 A1 | 6/2004 | Black et al. | |
| 2004/0133484 A1 | 7/2004 | Kreiner | |
| 2004/0181461 A1 | 9/2004 | Raiyani | |
| 2004/0193641 A1 | 9/2004 | Lin | |
| 2004/0215667 A1 | 10/2004 | Taylor et al. | |
| 2004/0217864 A1 | 11/2004 | Nowak | |
| 2004/0222298 A1 | 11/2004 | Dearing | |
| 2004/0233040 A1 | 11/2004 | Lane | |
| 2004/0238635 A1 | 12/2004 | Ozaki | |
| 2004/0245332 A1 | 12/2004 | Silverbrook | |
| 2004/0250066 A1 | 12/2004 | Di Luoffo | |
| 2004/0267395 A1 * | 12/2004 | Discenzo et al. | 700/99 |
| 2005/0033619 A1 | 2/2005 | Barnes | |
| 2005/0062603 A1 | 3/2005 | Fuerst et al. | |
| 2005/0068190 A1 | 3/2005 | Krause | |
| 2005/0092825 A1 | 5/2005 | Cox et al. | |
| 2005/0108628 A1 | 5/2005 | Grambihler | |
| 2005/0119984 A1 * | 6/2005 | Rouvellou et al. | 706/47 |
| 2005/0138402 A1 | 6/2005 | Yoon | |
| 2005/0150952 A1 | 7/2005 | Chung | |
| 2005/0150953 A1 | 7/2005 | Alleshouse | |
| 2005/0237194 A1 | 10/2005 | VoBa | |
| 2006/0047789 A1 | 3/2006 | Kumar et al. | |
| 2006/0116160 A1 | 6/2006 | Fuccello | |
| 2006/0195473 A1 | 8/2006 | Lin | |
| 2007/0243925 A1 | 10/2007 | LeMay | |

FOREIGN PATENT DOCUMENTS

| | | |
|---|---|---|
| JP | 2002-117298 | 4/2002 |
| JP | 2003288624 | 10/2003 |
| JP | 2004-217426 | 8/2004 |
| WO | WO 03/102845 | 7/2003 |
| WO | WO03060752 | 7/2003 |
| WO | 03102845 | 12/2003 |
| WO | WO2004/066077 | 8/2004 |
| WO | WO 2005078633 | 8/2005 |

OTHER PUBLICATIONS

European Search Report dated Oct. 2, 2006, mailed Feb. 10, 2006 for European Patent Application Seial No. 05107796, 6 pages.

Tsetsos, et al. "Commerical Wireless Sensor Networks: Technical and Business Issues" Proceedings of the Second Annual Conference on Wireless On-Demand Network Systems and Services (Jan. 19-21, 2005) 8 pages.

Branch, et al. "Sentire: A Framework for Building Middleware for Sensor and Actuator Networks" Proceedings of the Third International Conference on Pervasive Computing and Communications Workshops Mar. 8, 2005) pp. 396-400.

Harrison, et al. "Information Management in the Product Lifecycle—the Role Networked RFID" Proceedings of the Second IEE International Conference (Jun. 24, 2004) pp. 507-512.

Bornhovd, et al. "Integrating Smart Items with Business Processes an Experience Report" Proceedings of the Thirt-Eighth Hawaii International Conference on System Science (Jan. 3, 2005) 8 pages.

Ganesh, et al. "Web Services and Multi-Channel Integration: A Proposed Framework" Proceedings of the IEEE International Conference on Web Services (Jul. 6, 2004) 8 pages.

European Search Report dated Feb. 6, 2006, mailed Feb. 6, 2006 for European Patent Application Seial No. 05107826, 7 pages.

Ortiz. "An Introduction to Java Card Technology—Part 1" http://developers.sun.com/techtopics/mobility/javacard/articles/javacard1/> last viewed Dec. 19, 2005, 14 pages.

Chen. "Understanding Java Card 2.0" URL:.com//javaworld/jw-03-1998/jw-03-javadev_p.html> last viewed Dec. 19, 2005, 12 pages.

IBM "alphaWorks: RFID Device Development Kit: Overview" http://www/alphaworks.ibm.com/tech/rfiddevice last viewed Nov. 7, 2005, 1 page.

Alien "ALR-9800 Enterprise RFID Reader" http://www.alientechnology.com/docs/AT_DS_9800_v3_WEB.pdf last viewed Nov. 17, 2005, 4 pages.

Eurpoean Search Report dated Feb. 7, 2006; mailed Feb. 7, 2006 for PCT Application Serial No. EP 05 10 8001; 7 pages.

European Search Report dated Mar. 9, 2006 mailed Mar. 22, 2006 for European Patent Application Serial No. EP05107794, 7 Pages.

Anonymous: "The Sun Global RFID Betwork Vision: Connecting Businesses at the Edge of Network" Internet Article, Jul. 2004, http://www.sun.com/software/solutions/rfid/Sun_RFIS_Vision_rla.pdf.

European Search Report dated Oct. 4, 2006 and mailed Apr. 11, 2006 for EP 05108005, 9 pages.

European Search Report dated May 11, 2006, mailed May 12, 2006 for European Patent Application Serial No. EP05107744, 9 pages.

European Search Report dated Mar. 9, 2006, mailed Mar. 27, 2006 for European Patent Application Serial No. EP05107744, 7 pages.

U.S. Appl. No. 11/141,533, Mail Date Jun. 22, 2010, Office Action.

Office Action dated Jan. 10, 2008 cited in U.S. Appl. No. 11/141,533.

Office Action dated Jul. 28, 2008 cited in U.S. Appl. No. 11/141,533.

Office Action dated Jan. 26, 2009 cited in U.S. Appl. No. 11/141,533.

Office Action dated Jul. 20, 2009 cited in U.S. Appl. No. 11/141,533.

Office Action dated Jul. 31, 2009 cited in U.S. Appl. No. 11/061,337.

OA for Chinese Application Serial No. 200510091693.0, 10 Pages.

International Search Report dated and mailed Jul. 27, 2007 for PCT Application Serial No. PCT 2007/004005, 6 pages.

U.S. Appl. No. 60/606,281, filed Sep. 1, 2004, Kumar, et al.

U.S. Appl. No. 60/606,577, filed Sep. 2, 2004, Kumar, et al.

U.S. Appl. No. 11/141,533, filed May 31, 2005, Kumar, et al.

U.S. Appl. No. 11/025,702, filed Dec. 29, 2004, Kumar, et al.

U.S. Appl. No. 11/061,337, filed Feb. 18, 2005, Kumar, et al.

U.S. Appl. No. 11/069,459, filed Mar. 1, 2005, Kumar, et al.

U.S. Appl. No. 11/061,356, filed Feb. 18, 2005, Kumar, et al.

U.S. Appl. No. 11/140,726, filed May 31, 2005, Argarwal, et al.

U.S. Appl. No. 11/061,356, Mail Date Nov. 17, 2010, Office Action.

U.S. Appl. No. 11/141,533, Mail Date Feb. 3, 2011, Notice of Allowance.

U.S. Appl. No. 11/061,356, Mail Date May 9, 2011, Office Action.

Notice of Allowance of Allowance dated Sep. 29, 2011 cited in U.S. Appl. No. 11/061,356.

* cited by examiner

RULE-BASED FILTERING AND ALERTING

CROSS-REFERENCE TO RELATED APPLICATION(S)

This application claims the benefit of U.S. Provisional Patent Application Ser. No. 60/606,281 filed on Sep. 1, 2004, entitled "SYSTEM AND METHODS THAT FACILITATE RFID SERVER PROGRAMMING MODEL AND API'S," and U.S. Provisional Patent Application Ser. No. 60/606,577 filed on Sep. 2, 2004, entitled "FACILITATE RFID SERVER PROGRAMMING MODEL AND API'S." The entireties of these applications are incorporated herein by reference.

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g., tag transceivers), tag writers, tag-programming stations, circulation readers, sorting equipment, tag inventory wands, etc. Such RFID systems can collect and/or accumulate an immense amount of data. Although statistical analysis of such data can be useful, the collected data is more useful and powerful when integrated into a particular business procedure associated with a type of business and a type of processed. The variations associated with the numerous business procedures typically invoked two separate systems to model and execute the business or workflow process and the policies and/or business rules, which can be a tedious and inefficient manner in relation to updates and/or upgrading such systems.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate incorporating a rules engine (RE) that utilizes rule-based technology into an RFID network. A RE component can execute declarative event policies consisting of one or more logical rules that are grouped together to perform in memory filtering, alerting, deduction or inferences based on events and data, and/or transformation of RFID events into higher order events for consuming business processes as rules associated with an RFID network, wherein the rules can include a rule set adhered to an event, condition, and action format. Thus, the RE component can be a rule-based system that provides development of new rule-based applications as well as the incorporation of rule-based technology into existing applications. Additionally, the RE component can be a light weight embeddable rule engine that can be hosted by a plurality of applications on various locations (e.g., device, computer, laptop, desktops, servers, enterprise servers, etc.).

In accordance with one aspect of the claimed subject matter, the RE can further utilize a rule component. The rule component can provide dynamic declarative event policies consisting of one or more logical rules that are grouped together to perform in memory filtering, alerting, deduction or inferences based on events and data, and/or transformation of RFID events into higher order events for consuming business processes, wherein rules that are contained within rulesets that adhere to a fixed format known as, for example, event, condition, action rules (also referred to as ECA rules)

can be employed. The rule component can also utilize rule conditions that consist of a set (e.g., one or more) of predicates and optional logical connectives (e.g., and, or, not, etc.) to form a logical expression that evaluates to a true or false value. If the logical expression formed from the rule conditions evaluates to true, the rule actions (e.g., a sequence of functions) are executed. If the logical expression evaluates to false, the actions are not executed.

In accordance with another aspect of the claimed subject matter, the RE can further implement an update component that can provide dynamic real-time updates to rules based at least in part upon a current version. The update component allows the rules associated with the declarative event policies (e.g., consisting of one or more logical rules that are grouped together to perform in memory filtering, alerting, deduction or inferences based on events and data, and/or transformation of RFID events into higher order events for consuming business processes) to be updated without an application and/or RE restart and/or stop. Moreover, the RE can implement a vocabulary component that provides terms that define rules and/or rule conditions and actions. The terms utilized to define rule conditions and actions can be expressed by domain and/or industry specific nomenclature. Furthermore, the RE can utilize a composer that can create a vocabulary based at least in part upon the industry specific nomenclature. In other aspects of the claimed subject matter, methods are provided that facilitate incorporating a rules engine (RE) that utilizes rule-based technology into an RFID network.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
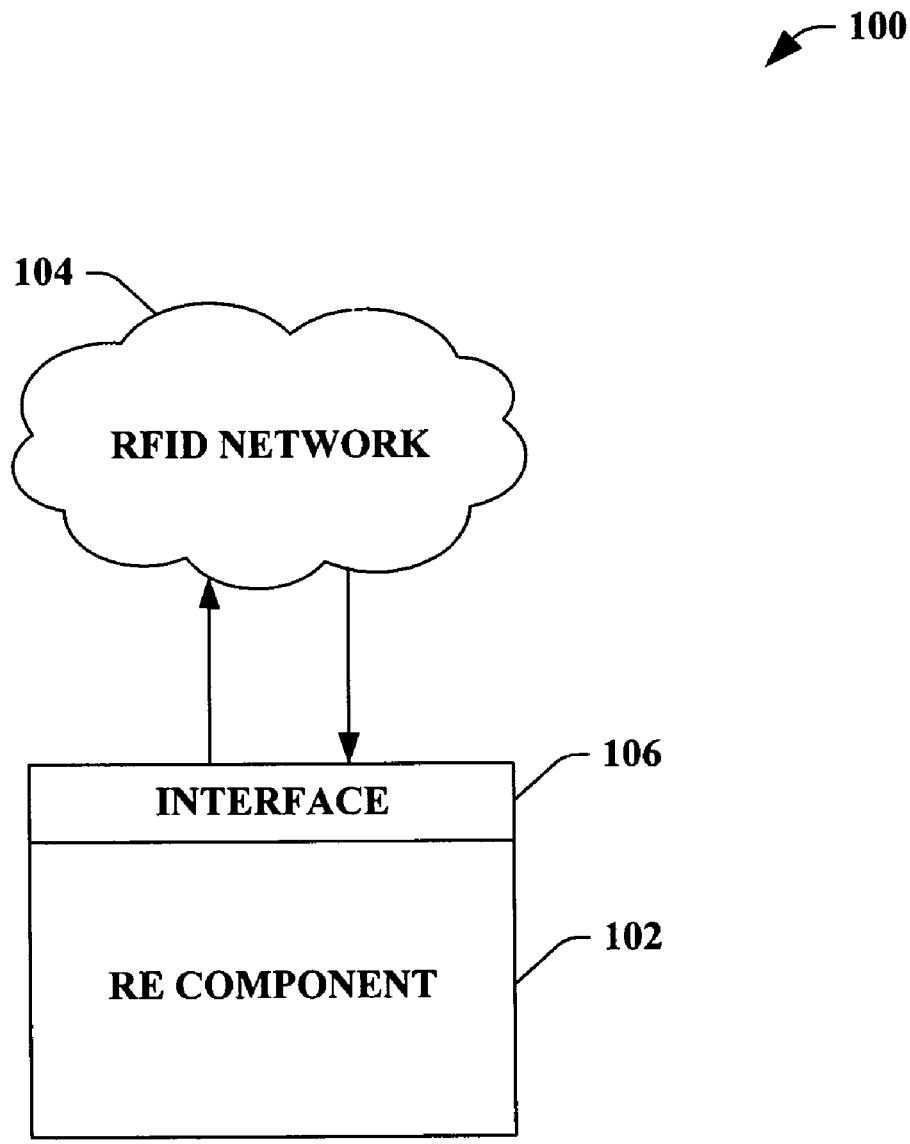
FIG. 1 illustrates a block diagram of an exemplary system that facilitates incorporating a rules engine that utilizes rule-based technology into an RFID network.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Now turning to the figures, FIG. 1 illustrates a system 100 that facilitates incorporating a rules engine (RE) that utilizes rule-based technology into an RFID network. A rules engine (RE) component 102 can represent and/or execute declarative event policies (e.g., consisting of one or more logical rules that are grouped together to perform in memory filtering, alerting, deduction or inferences based on events and data, and/or transformation of RFID events into higher order events for consuming business processes) in an RFID network 104 as rules. For instance, the device within the RFID network 104 can be, but is not limited to an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. The RE component 102 can facilitate the development of new rule based applications and the incorporation of rule-based technology into existing applications, wherein the applications can be related to, for instance, the RFID network 104.

The RE component 102 can provide an efficient inference engine capable of linking readable, semantically rich rules to any business objects (e.g., components, etc.), documents (e.g., extensible markup language (XML), etc.), and/or tables (e.g., related to a database, etc.). A rule utilized by the RE component 102 can be constructed by a user during the development of an application, wherein small building blocks of business logic (e.g., small rule sets) that operate on information (e.g., facts, raw data stream related to RFID tags in the RFID network 104, etc.) contained in such business objects, tables, and/or documents. By utilizing such a technique, the RE component 102 enhances code reuse, design simplicity, and the reuse and/or modularity of business logic. It is to be appreciated that the RE component 102 can be, but is not limited to, a business rule engine component. Moreover, the business logic related to various specific business procedures can be integrated with the RFID network.

In addition, the RE component 102 can implement such rules associated with the RFID network 104. The rules can be grouped into logical containers or policies based at least in part upon their purpose. Such policies can be versioned and/or deployed, wherein subscribing applications can receive dynamic updates (e.g., current versions, and/or latest versions of deployed policies) in real-time without application down-time and/or re-compilation. For instance, policies within the RFID network 104 can include a filter to eliminate duplicate RFID tag reads and an alert to inform when a pallet (e.g., identified by the RFID tag) is at a shipping station. Such policies can be updated such that the filter can be changed to eliminate item reads and allow only pallet reads and the alert can be changed to sound an alarm if the pallet is moving within a particular time period. By implementing the rule-based technology with the RFID network 104, the RE component 102 can dynamically update such rules (e.g., policies) during real-time so as not to require any re-compilation of code, application down-time, etc. In other words, a shipping process running on the RFID network 104 can continuously run in real-time regardless of the updates and/or changes relating to rules utilized with the shipping application and/or shipping process.

In one example, the RFID network 104 can include at least one RFID device that is associated with at least one RFID process. It is to be appreciated that the RFID process can utilize any suitable number of RFID devices within the RFID network 104. An RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, . . . . Additionally, the RFID process can include an RFID device service, a tag read, an event, a tag write, a device configuration, a geographic tracking, a number count, etc. It is to be appreciated that the process can have raw data collected via at least one device associated with the RFID network 104, wherein such raw data can be manipulated based at least in part upon a rule and the RE component 102.

Moreover, the system 100 can include any suitable and/or necessary interface component 106, which provides various adapters, connectors, channels, communication paths, etc. to integrate the RE component 102 into virtually any operating, RFID, and/or database system(s). In addition, the interface component 106 can provide various adapters, connectors, channels, communication paths, etc., that provide for inter-action with the RE component 102, and the RFID network 104.

Figure 2:
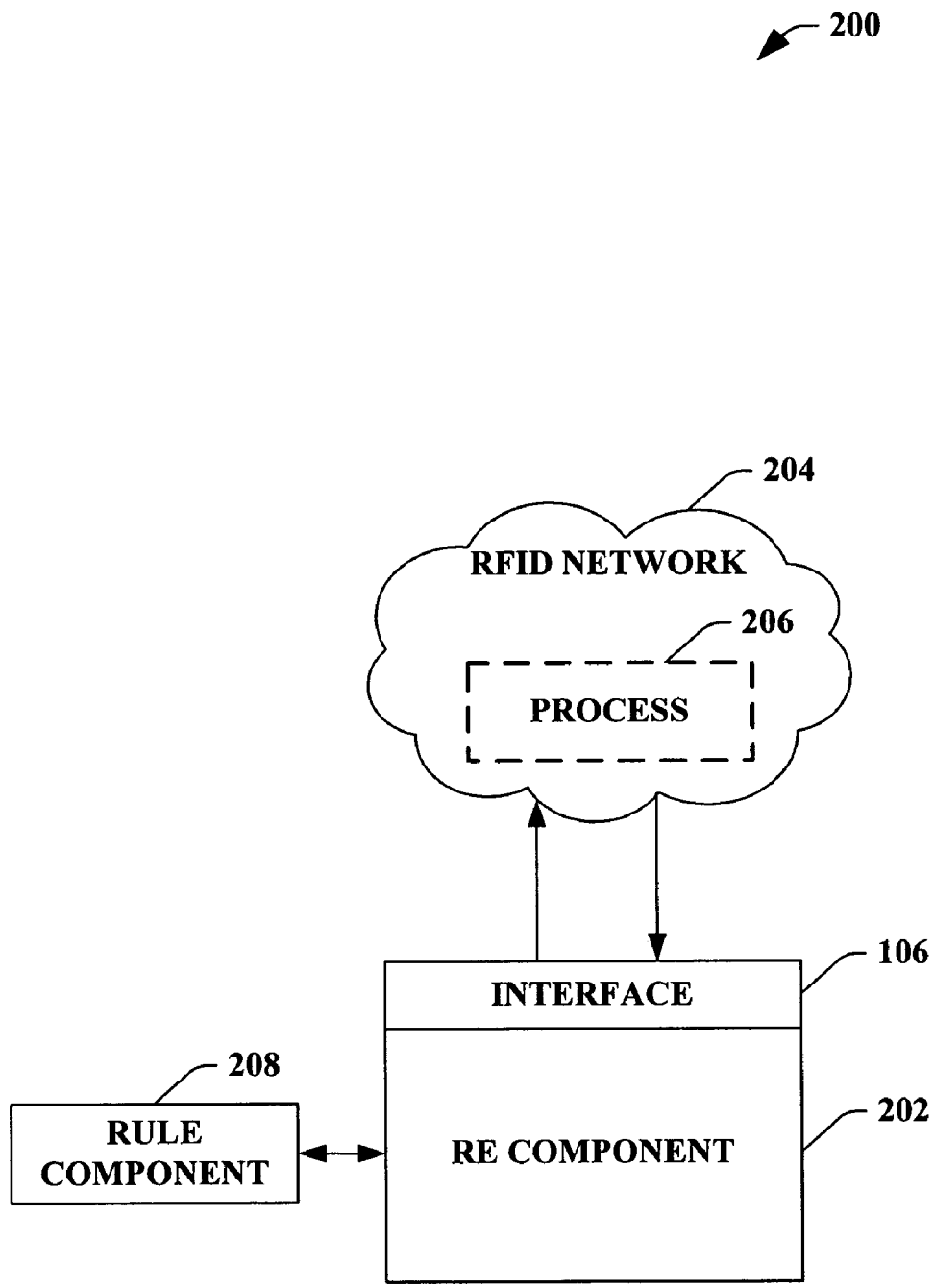
FIG. 2 illustrates a block diagram of an exemplary system that facilitates utilizing a rules engine to provide declarative event policies associated with an RFID network.

FIG. 2 illustrates a system 200 that facilitates utilizing a rules engine to provide declarative event policies (e.g., consisting of one or more logical rules that are grouped together to perform in memory filtering, alerting, deduction or inferences based on events and data, and/or transformation of RFID events into higher order events for consuming business processes) associated with an RFID network. A RE component 202 can represent and execute declarative event policies as rules associated with an RFID network 204. The RE component 202 can be a rule-based system that provides development of new rule-based applications as well as the incorporation of rule-based technology into existing applications. It is to be appreciated that the RE component 202 can be compliant with a processor independent platform. In one instance the RE component 202 can be a general purpose rule-based system. Additionally, the RE component 202 can be a light weight embeddable rule engine that can be hosted by a plurality of applications on various locations (e.g., device, computer, laptop, desktops, servers, enterprise servers, etc.).

The RFID network 204 can include at least one device (e.g., an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc.) that is associated with at least one RFID process 206. The RFID network 204 can include various sub-systems based at least in part upon location, function, and/or process. For example, an RFID network 204 can be two groups and/or collections of devices, one at a shipping door and another at a receiving door. Such RFID network 204 can further include a process 206 associated with each groups and/or collection of devices based at least in part upon the group and/or collection name, location, and/or process name. For instance, the process 206 can be a shipping process that is related to the devices at the shipping door, wherein the devices can collect data at such location. Similarly, another process 206 can be a receiving process that is related to the devices at the receiving door, wherein the devices can collect data at such location. Thus, the RE component 202 can provide a rule-based system in association with any application related to the RFID network 204 such that a declarative event policy can be utilized as a rule(s).

The process 206 is an uber and/or high-level object that can provide a meaningful unit of execution. For instance, the process 206 can be a shipping process that represents multiple devices at various dock doors working together to perform tag reads, filtering, read enrichment, alert evaluation, and data storage in a sink for a host application to retrieve/process. In another example, the process 206 can execute a manufacturing process, wherein devices are configured to read as well as write dependent upon a location. Moreover, additional functions such as filtering, alerting, enriching, etc. can be implemented at the location. In yet another example, the process 206 can write to a tag process, wherein a tag can be written in real-time based at least upon an input. The write process can also check if the write succeeded by reading and passing data back to the host.

The system 200 further includes a rule component 208 that can be implemented by the RE component 202 to provide dynamic declarative event policies. The rule component 208 can employ rules that are contained within rule-sets that adhere to a fixed format known as, for example, event, condition, action rules (also referred to as ECA rules). For instance, the definition of the ECA rule can be as follows:

> On
>     RFID Event
> If
>     Conditions
> Then
>     Actions

The rule component 208 can utilize the rule conditions that consist of a set (e.g., one or more) of predicates and optional logical connectives (e.g., and, or, not, etc.) to form a logical expression that evaluates to a true or false value. If the logical expression formed from the rule conditions evaluates to true, the rule actions (e.g., a sequence of functions) are executed. If the logical expression evaluates to false, the actions are not executed. It is to be appreciated that the event associated with the "On" statement can be implicit in that facts added to and/or removed from the RE component 202 represent events as do facts created during rule action execution.

The following is an example of a business rule associated with the RFID network 204 in pseudo code format that the RE component 202 can utilize to provide declarative event policies (e.g., filtering and/or alerting). It is to be appreciated that the following example is only one for descriptive purposes and the claimed subject matter is not so limited.

```
ON EVENT
    TagRead
IF
    TagList.Tag.type = = EPC
AND
    TagListTag.ID.objectType = = PALLET
THEN
    Allow
```

The declarative representation of the above example business rule (e.g., business user view) is as follows: Register only pallet level reads-filter out the rest of the reads.

Collections of related rules (e.g., rules governing an alert criteria based on a time period for theft of goods) can be grouped together into versioned rule sets. It is to be appreciated that the rule definitions can be accessible to non-programmers and such rule definitions can be stored in a canonical format with graphic user interface (GUI) based tools to provide access to rule conditions and actions. In addition, the RE component 202 can represent rule definitions utilizing any suitable programmable code. In one example, the RE component 202 can utilize XML based dialect such as, but not limited to, business rules language (BRL). The BRL can consist of an abstract and/or technology neutral representation of the rules along with bindings to technology specific condition and action implementations in the form of, for instance, classes, documents (e.g., XML documents), XML document elements, XML document attributes databases, table columns, and/or database table columns. The rule conditions and actions can be defined in terms of user specific classes, or class library classes, properties, and/or fields. It is to be appreciated that developers can utilize a processor independent framework that utilizes framework classes exposed and any additions to the framework later provided.

The rule definitions can be collected into sets and saved into, for instance, a reliable, persistent data store (not shown). In one example, the RE component 202 can leverage a server such as a structured query language (SQL) server as a primary store for versioned rule sets and utilized for deployment. It is to be appreciated that the rule set definitions can be stored and/or deployed in/from a local file system and any other suitable manner. For instance with an enterprise level application, rule set definitions can be pushed from a back end server containing a rule store to middle tier servers running applications that host the RE component 202, rule component 208 and execute such rules.

Furthermore, it is to be appreciated that the RE component 202 can be a versatile, single light weight (e.g., less than 900K footprint for a small 10 rule set) framework compliant class library (e.g., a processor independent platform framework compliant class library, etc.) that implements a high performance forward chaining algorithm for rule evaluation. Optional functionality (e.g., rule set execution tracking, rule set deployment, etc.) can be plugged into the system 200 as needed. By utilizing a plug-in technique, an easy to use application integration abstraction representing a rule set can be exposed to the RFID network 204. The RE component 202 can be utilized just as the instantiation of a component, wherein the option of providing data utilized to drive the rules and invoking a single method called "Execute( )."Moreover, the RE component 202 can be hosted by any application on any platform (e.g., device, laptop, desktop, computer, server, etc.) that can benefit by leveraging rule-based technology and automatically adjusting resource utilization. The automatic adjustment of resources utilization (e.g., memory footprint) can be based at least in part upon the number of rules and number and/or different types of objects referenced in rule conditions and actions.

The RE component 202 can be immensely scalable. The base in-memory rule condition evaluation and action execution algorithm provided by the RE component 202 provides enhanced performance against devices, desktops, laptops, computers, servers, and enterprise scenarios. For instance, the base in-memory RE matching algorithm can reference up to 100,000 objects and contain 50,000 rules. In addition, multiple processor machines can be leveraged by running parallel instances of the RE component 202 against the same and/or different rule sets. In one example, some enterprise scenarios (e.g., publish subscribe services) require different types of matching algorithms tailored to specific rule set definitions (e.g., 100,000s+ of substantially similar formed subscriptions for 100,000s+ of substantially similar formed events). The RE component 202 can support such scenarios by providing a pluggable architecture that allows plug-in rule set executors that handle rule condition evaluation and action execution. For example, a plug-in rule set executor that implements a highly scalable, albeit more restrictive with respect to rule set definition, set-oriented algorithm can be employed to implement publish and/or subscribe services. It is to be appreciated that the RE component 202 is light weight to support scenarios where 10s of rules are defined for rule sets.

Figure 3:
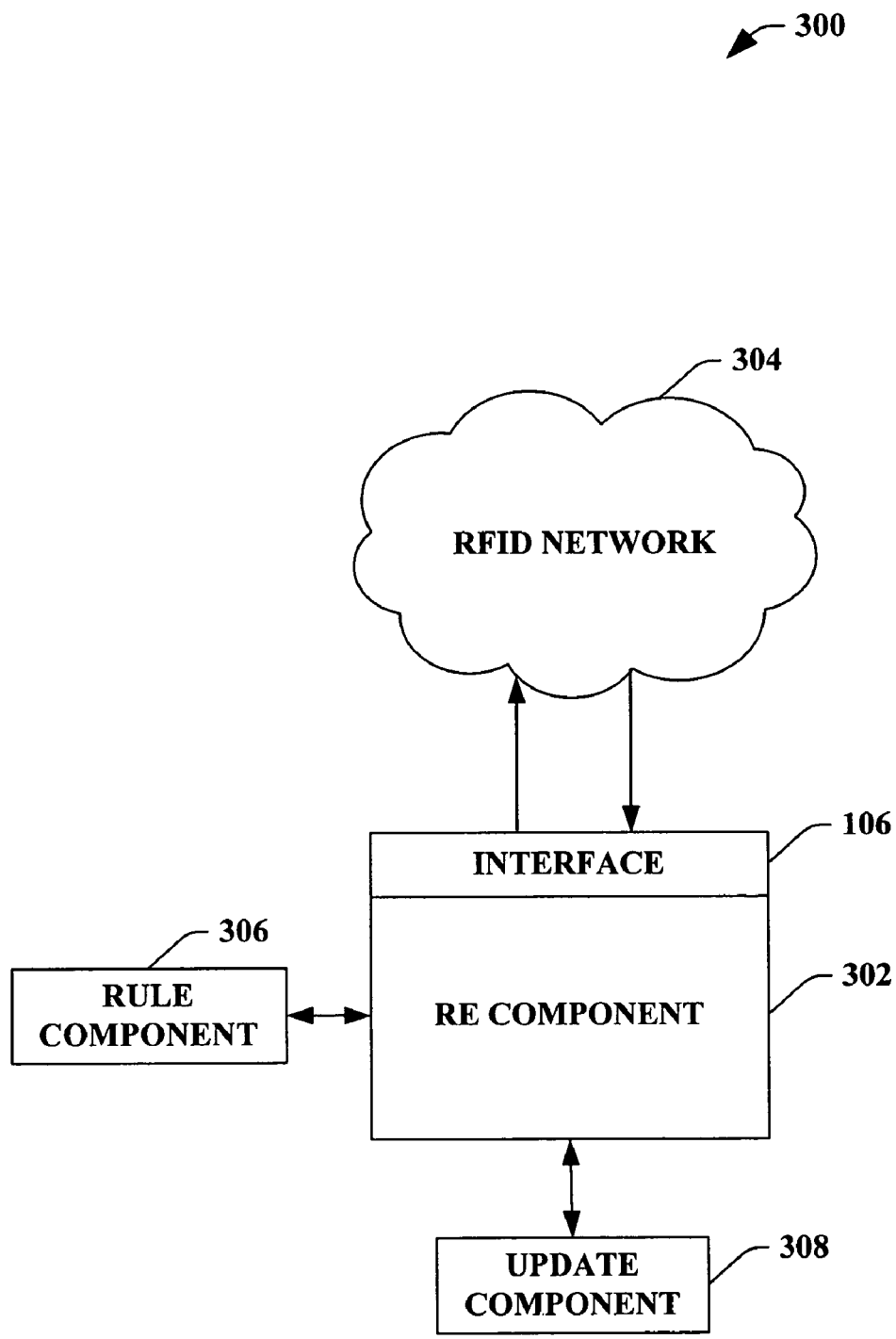
FIG. 3 illustrates a block diagram of an exemplary system that facilitates dynamically updating rules utilized with an RFID network.

FIG. 3 illustrates a system 300 that facilitates dynamically updating rules utilized with an RFID network. A RE component 302 can employ a filter and/or an alert associated with an RFID network 304 as a rule, wherein such rule can be executed based at least in part upon a rule condition evaluating to a true or a false. The RE component 302 can be a rule-based system that provides development of new rule-based applications as well as the incorporation of rule-based technology into existing applications. It is to be appreciated that the RE component 302 can be compliant with a processor independent platform and/or be a general purpose rule-based system. The RE component 302 can also be a light weight embeddable rule engine that can be hosted by a plurality of applications on various locations (e.g., device, computer, laptop, desktops, servers, enterprise servers, etc.). The RE component 302 can further utilize a rule component 306 that employs rules that are contained within rule-sets that adhere to a fixed format known as, for example, event, condition, action rules (also referred to as ECA rules). It is to be appreciated that the RE component 302, the RFID network 304, and the rule component 306 can be substantially similar to components and/or networks previously described.

The RE component 302 can further utilize an update component 308 that provides dynamic real-time updates associated to the rules related to a filter and/or an alert. As stated above, various applications and/or business scenarios can require a plurality of rules, rule sets, etc. Moreover, such rules and/or rule sets can be versioned based at least in part upon changes made therewith. For example, a rule set can include conditions and actions related to a filter and/or an alert associated with the RFID network 304 and a device therein. If the rule set is to change, the update component 308 can provide such updated rule set to the RE component 302 in real-time without any need for restart of an application, component, and/or engine.

New versions of rule sets can be auto deployed by the update component 308. Thus, when a new version of a rule set is deployed, it can be readily utilized and does not require and/or cause an application or rule engine restart. By providing such a dynamic real-time update, users can morph business logic (e.g., rules) or preferences in real-time without requiring any development assistance. It is to be appreciated that the update component 308 can be a stand-alone unit, a service, incorporated into the RE component 302, incorporated into the rule component 306, or any combination thereof.

Figure 4:
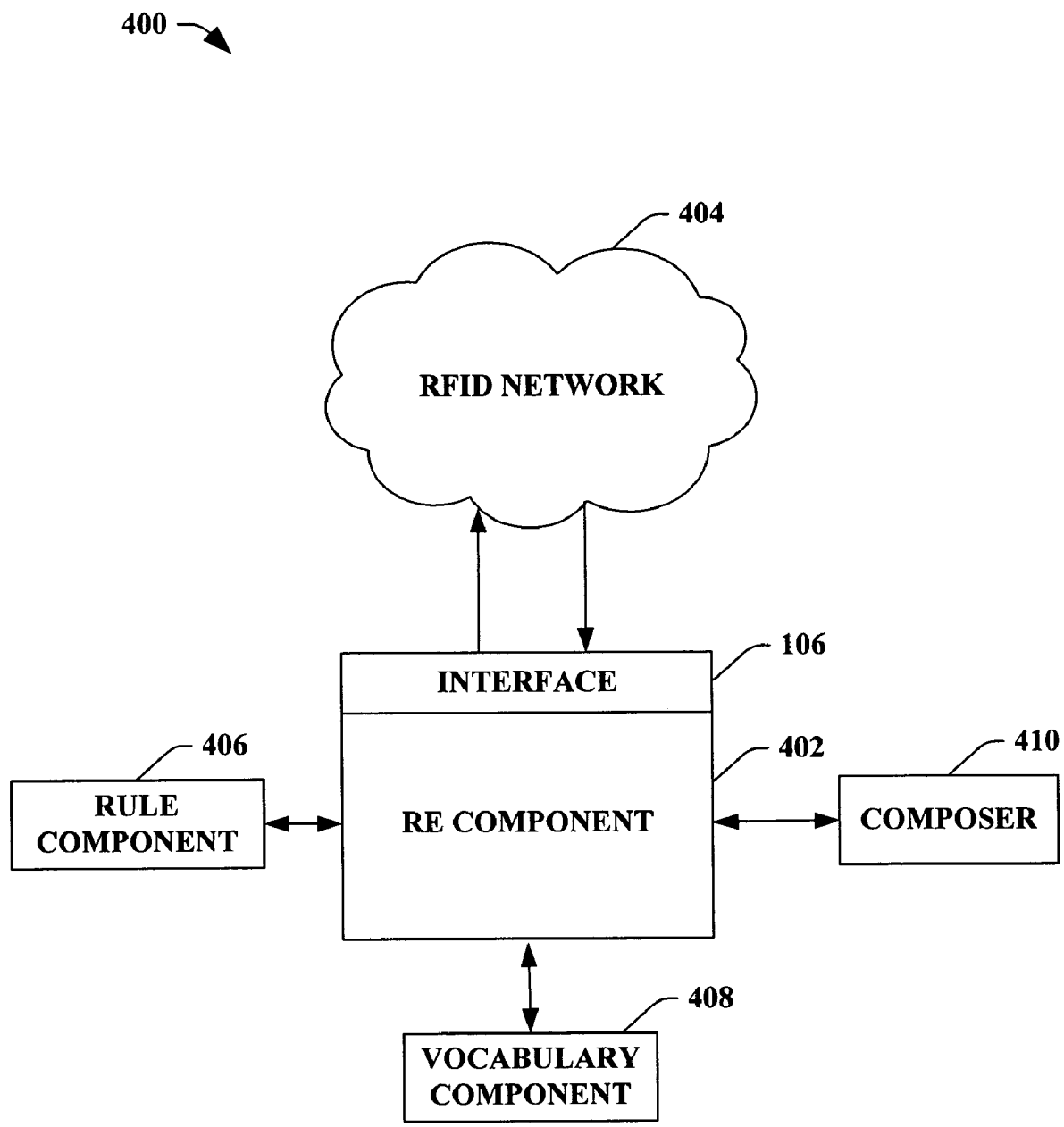
FIG. 4 illustrates a block diagram of an exemplary system that facilitates utilizing a rules engine and an RFID network with various business procedures.

FIG. 4 illustrates a system 400 that facilitates utilizing a rules engine and an RFID network with various business procedures. A RE component 402 can represent and/or execute a declarative filter and/or a declarative alert associated with an RFID network 404 as a rule. The RE component 302 can be a rule-based system that provides development of new rule-based applications as well as the incorporation of rule-based technology into existing applications. The RE component 402 can utilize a rule component 406 that employs rules that are contained within rule-sets that adhere to a fixed format known as, for example, event, condition, action rules (also referred to as ECA rules). It is to be appreciated that the components and/or networks associated with FIG. 4 can be substantially similar to previously described components and/or networks.

The RE component 402 can employ a vocabulary component 408 that provides terms that define rules and/or rule conditions and actions. Rules are a powerful tool for defining what can occur when a particular situation arises. The terms utilized to define rule conditions and actions can be expressed by domain and/or industry specific nomenclature. For instance, an email user writes rules in terms of messages "received from" and messages "received after" while an insurance business analyst writes rules in terms of "risk factors" and "coverage amount."

Underlying this domain specific terminology are the technology artifacts (e.g., objects, database tables, documents, XML documents, etc.) that implement rule conditions and rule actions. The vocabulary component 408 can bridge the gap between visualization and implementation. The vocabularies utilized by the vocabulary component 408 can be versioned collections of definitions with each definition mapping a domain specific term to an implementing technology. In other words, the vocabulary component 408 can invoke various "skins" atop the underlying technology based at least in part upon the domain utilized therewith. In one example, the vocabularies can be stored utilizing an XML dialect such as, but not limited to, vocabulary markup language (VML). The vocabularies can be consumed by tool developers responsible for integrating rule authoring into new or existing applications.

The system 400 further includes a composer 410 that can be utilized to create a vocabulary based at least in part upon the domain context. For example, a business analyst can employ the composer 410 to define vocabularies which can then be persisted into a shared rule store (discussed above). The composer 410 can natively support the creation of rules utilizing any class, database table, schema, and/or XML schema. For instance, complete rule-based applications can be built utilizing a drag and drop paradigm without writing code. In addition, the composer 410 can be implemented by a developer tasked with creating rules, rule templates, rule sets, and/or vocabularies.

Figure 5:
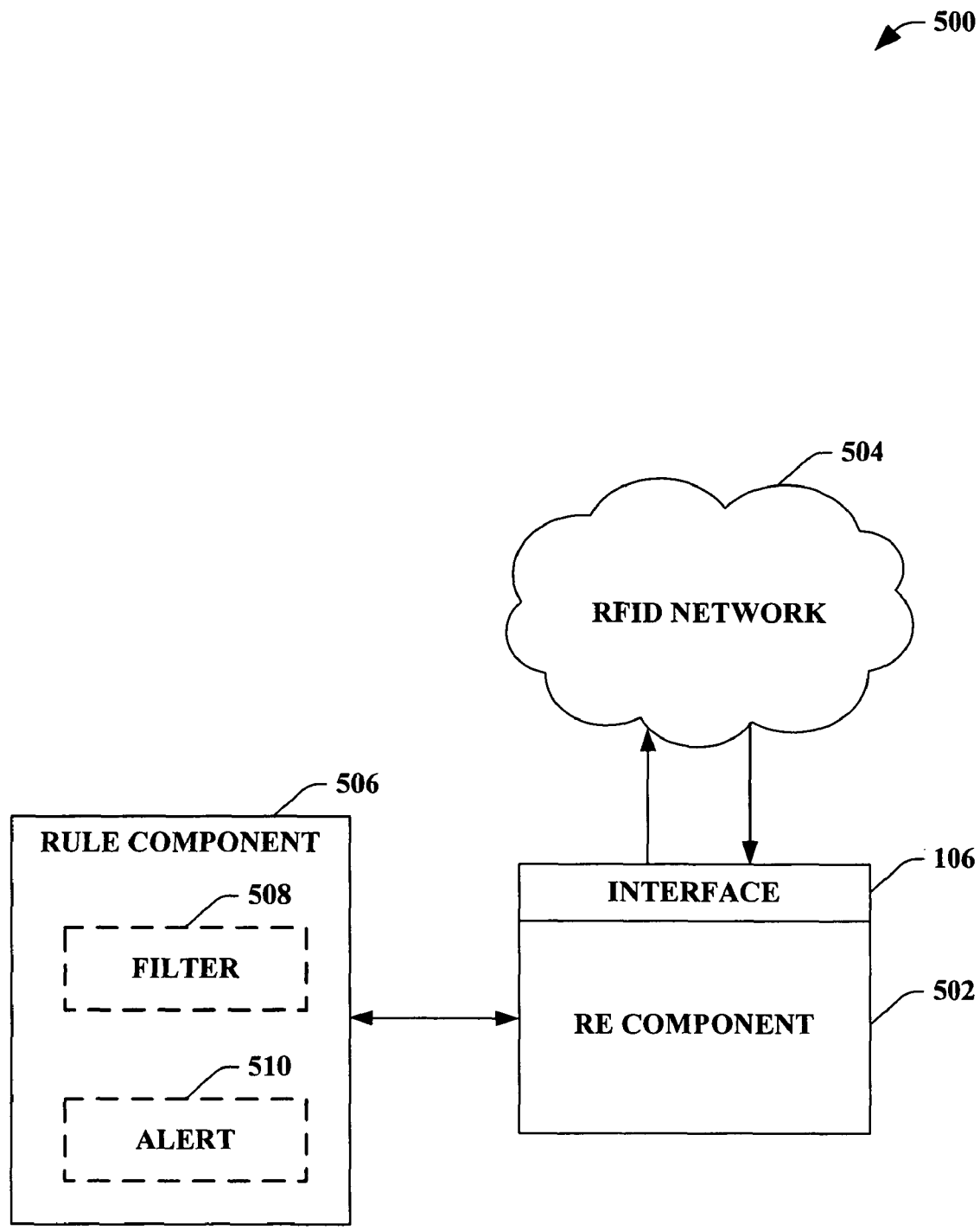
FIG. 5 illustrates a block diagram of an exemplary system that facilitates declaring a filter and/or an alert as a rule utilized with a rules engine associated with an RFID network.

FIG. 5 illustrates a system 500 that facilitates declaring a filter and/or an alert as a rule utilized with a rules engine associated with an RFID network. A RE component 502 can implement rules that are based at least in part upon a filter (e.g., that allow RFID tag reads) and an alert (e.g., that execute a defined action), wherein the filter and the alert are associated with an RFID network 504. The RE component 502 can invoke a rule component 506 that utilizes rules (e.g., based at least in part upon a filter 508 and an alert 510) that are contained within rule-sets that adhere to a fixed format known as, for example, event, condition, action rules (also referred to as ECA rules). It is to be appreciated that the components and/or networks in the system 500 can be substantially similar to previously described components and/or networks.

The rule component 506 can utilize the filter 508 that can relate to the RFID network 504. It is to be appreciated that the filter 508 does not need to be included within the rule component 506 and is only depicted as such for the sake of brevity. The filter 508 can be an optional construct that executes on incoming raw data streams from the RFID network 504. Such construct can be considered a logical source, wherein the logical source is a grouping of device collections (e.g., a device such as an RFID reader and the collection being based on, for instance, a location), filter and alert policies, and event handlers (e.g., handles platform events, implements custom logic, etc.). The filter 508 can allow certain types of tag reads. Moreover, at least one filter 508 can be grouped into a logical filter collection. The filter 508 can include at least one of the following: 1) a removal of duplicate reads (e.g., allow only non-duplicate reads from a logical source); and 2) allow a combination of pallets, cases, items, etc. (e.g., each can be exclusive as well).

The rule component 506 can further utilize the alert 510 that can relate to the RFID network 504. It is to be appreciated that the alert 504 does not need to be included within the rule component 506 and is only depicted as such for the sake of brevity. The alert 510 can be a more generic and/or powerful mechanism to express simple rules that need to be evaluated against tag data streams that pass filters and execute 1 or more user defined actions. For example, if a tag read is registered between 6 P.M. and 6 A.M. by the logical source, then sound the alarm and alert the building supervisor via short message service (SMS). Moreover, the alert 510 can be optional constructs similar to the filter 508.

The alert 510 can be an alert on tag data streams from a logical source. In this example, the following can be implemented: 1) a range of tags (e.g., raise an alert if a tag in a given range is collected); 2) a time alert for tags (e.g., raise an alert if a tag is collected in a given time period); and 3) a read of the same tag for a given time (e.g., the pallet has been left on a ramp for an extended period of time). The following rules can be utilized in association with the above:

---

Rule 1:
    IF TRUE THEN DB. Add(Tag.ID, Tag.ReaderName, CurrentTime + Time to Expiry)
Rule 2:
    If (Tag.ID = DB.Tag.ID AND Tag.ReaderName = DB.Tag.ReaderName) AND (CurrentTime > DB.Time) THEN Alert(...), DB.Time = (CurrentTime + Time to Expiry)

---

In view of the above, the alert 510 can expect to read tags within a given time. Moreover, the alert 510 handles the situation when a tag is registered but the data is incomplete or not read (e.g., raising an alert when an erroneous read is encountered).

The alert 510 can also be an alert on a reader event raised by the RFID network 504 and/or a related platform. For instance, the following can be implemented: 1) a device is down (e.g., raise an alert if a device goes down); 2) a device is up (e.g., raise an alert when a device comes back up); and 3) a new device is discovered (e.g., raise an alert when a new device is added to the RFID network 504). In addition, the alert 510 can be definable on tag data parameters such as, but not limited to, identification (ID), type, source, time, data, and device name. Moreover, any parameter in an event associated with the RFID network 504 such as a device name and time for a device up event and/or a device down event.

The RE component 502 can allow the RFID network 504 to be agile and reactive to changes and/or manipulations in the business logic defining the rules for filters and/or alerts utilized in RFD processes. In particular, the RE component 502 provides an RFID process with the ability to dynamically morph with changes and/or manipulations in such logic without any application downtime, re-compilation, and re-deployment. In addition, the following advantages are provided by the RE component 502 utilized with the RFID network 504 for filters and/or alerts: 1) abstraction, storage, and execution of rules in the RFID network 504 in a uniform manner; 2) a flexible way to express custom rules (e.g., expression of complex logical expressions (AND, OR, NOT, etc.) in conditions and 1 or more actions via ECA style rules-conditions can utilize default predicates and functions that are available out of the box (OOB) as well as use custom predicates and functions; 3) ability to utilize business user friendly vocabularies (e.g., English terms for objects, XML elements, database columns, etc.) in rule definitions; 4) ability to evaluate a large number of rules in parallel and execute actions in a prioritized manner (e.g., with the ability to infer and forward-chain); 5) extend the RFID platform capability by allowing rule-based enrichment of tag reads etc.

It is to be appreciated that the filter 508 and the alert 510 can be defined utilizing the following events: 1) filter events (e.g., tag read event); and 2) alert events (e.g., tag read events, device events). Moreover, the schemas for the above events can be available at design time for rule composition as XML fact types. The RE component 502 can further support the following predicates and/or conditions: 1) relational; 2) temporal; 3) range; and 4) match. It is to be appreciated and understood that additional predicates and/or conditions can be defined and utilized to define different conditions for tag read event and device event data as vocabularies for predicates. The set of default vocabulary (e.g., standard parameter values) for the alert 510 and the filter 508 can include PALLET, CASE, GTIN, SSCC, etc. It is to be appreciated that the set of default vocabulary can be tag data components represented in an English like vocabulary for the end user(s).

In addition, the RE component 502 can support a set of default functions, yet additional custom functions can be supported for future implementation. For instance, filter actions can be utilized such as allow (e.g., a standard action that can exist for filter rules and/or made explicit), and any other actions such as EPCIS service(s) method calls, default logger, etc. In another example, alert actions can be utilized such as, but not limited to, sending email, sending SMS, page, create a log, etc.

Figure 6:
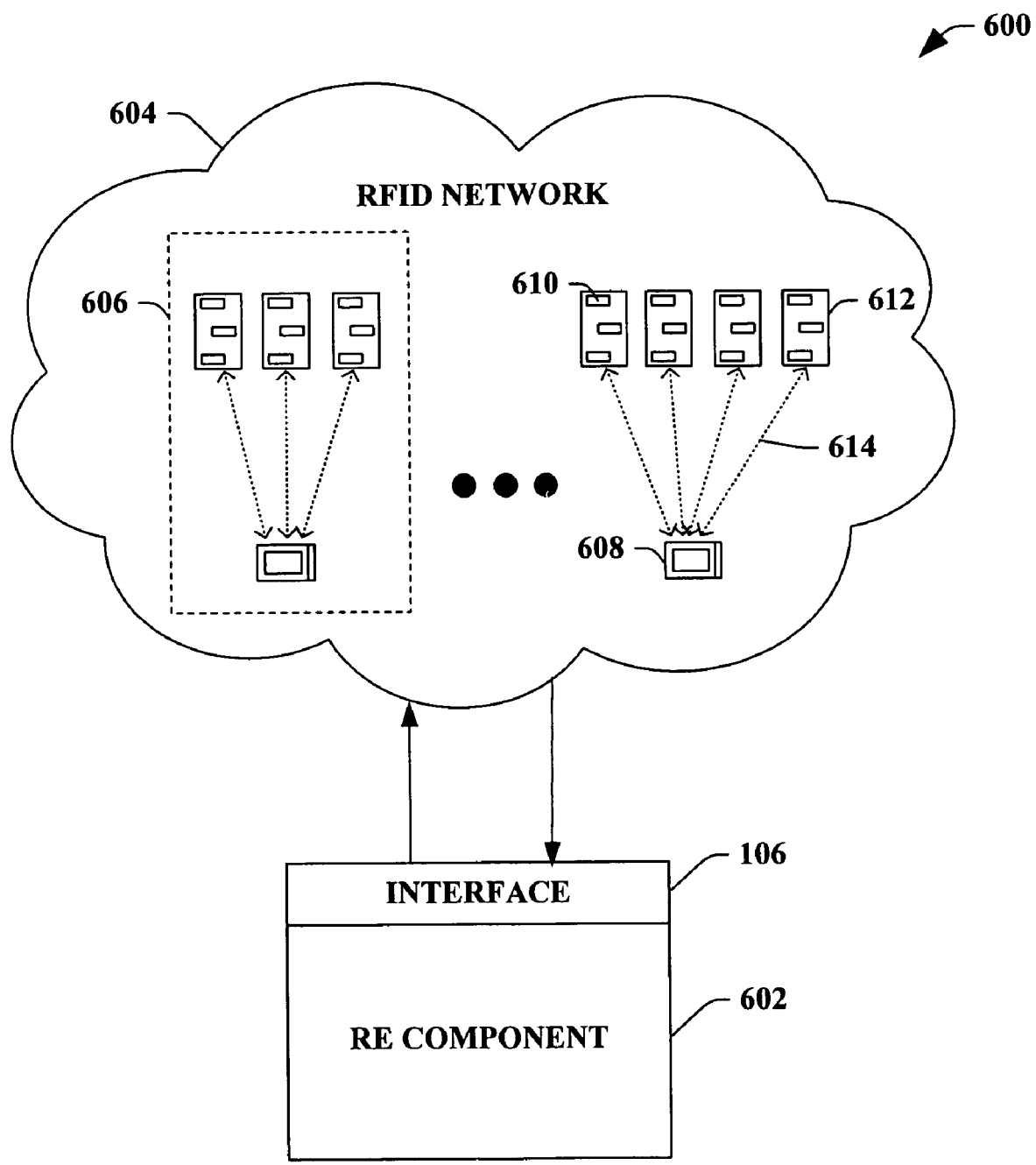
FIG. 6 illustrates a block diagram of an exemplary system that facilitates utilizing a rules engine to provide declarative event policies.

FIG. 6 illustrates a system 600 that facilitates utilizing a rules engine to provide declarative event policies. A RE component 602 can expose any real-time data associated with an RFID network 604 to allow the use of rule-based technology with declarative event policies associated therewith. The RE component 602 can represent and/or execute a declarative filter and/or a declarative alert associated with an RFID network 604 as a rule. The RE component 602 can provide the development of new rule-based applications as well as the incorporation of rule-based technology into existing applications. Moreover, the RE component 602 can utilize rules that are contained within rule-sets that adhere to a fixed format known as, for example, event, condition, action rules (also referred to as ECA rules). It is to be appreciated that the RE component 602 and the RFID network 604 can be substantially similar to respective components/networks described in previous figures.

The RFID network 604 can include a plurality of universes (e.g., sub-systems, RFID networks), wherein a universe is a server of RFID entities. For simplicity, the RFID network 604 illustrates a single universe containing two collections of devices (e.g., device collections), where a first collection 606 is shown. For instance, an RFID sub-system can be a location wherein the entities involved are related to a substantially similar process. In one example, a sub-system can be a warehouse containing a plurality of receiving and/or shipping dock doors with associated devices. Thus, first collection 606 can be a collection of devices within the specified sub-system. It is to be appreciated a plurality of collection of devices can be implemented. Within a collection of devices, a device 608 can receive an RFID signal 614 from a pallet of goods 612 containing at least one RFID tag 610. It is to be appreciated the pallets and/or goods can be tagged based at least upon user specifications (e.g., single pallets tagged, individual goods tagged, pallets and goods tagged, etc.).

Figure 7:
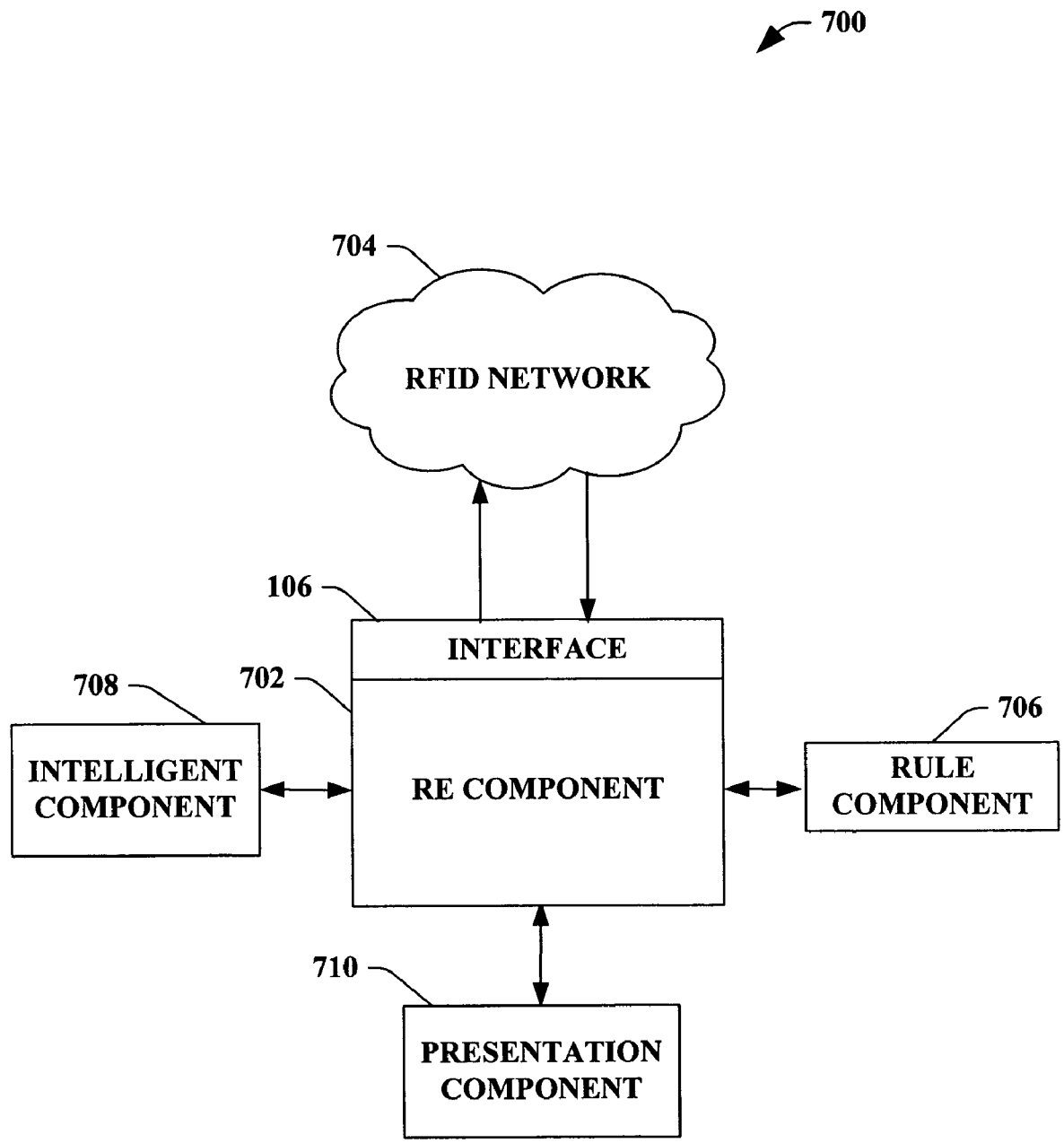
FIG. 7 illustrates a block diagram of an exemplary system that facilitates incorporating a rules engine that utilizes rule-based technology into an RFID network.

FIG. 7 illustrates a system 700 that employs intelligence to facilitate invoking rule-based technology with an RFID network. The system 700 can include a RE component 702, an RFID network 704, and a rule component 706 that can all be substantially similar to respective components and networks described in previous figures. The system 700 further includes an intelligent component 708. The intelligent component 708 can be utilized by the RE component 702 to facilitate utilizing rule-based technology to represent and execute filters and/or alerts as rules in association with the RFID network 704.

It is to be understood that the intelligent component 708 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 710 can provide various types of user interfaces to facilitate interaction between a user and any component coupled to the RE component 702. As depicted, the presentation component 710 is a separate entity that can be utilized with the RE component 702. However, it is to be appreciated that the presentation component 710 and/or similar view components can be incorporated into the RE component 702 and/or a stand-alone unit. The presentation component 710 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the RE component 702.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
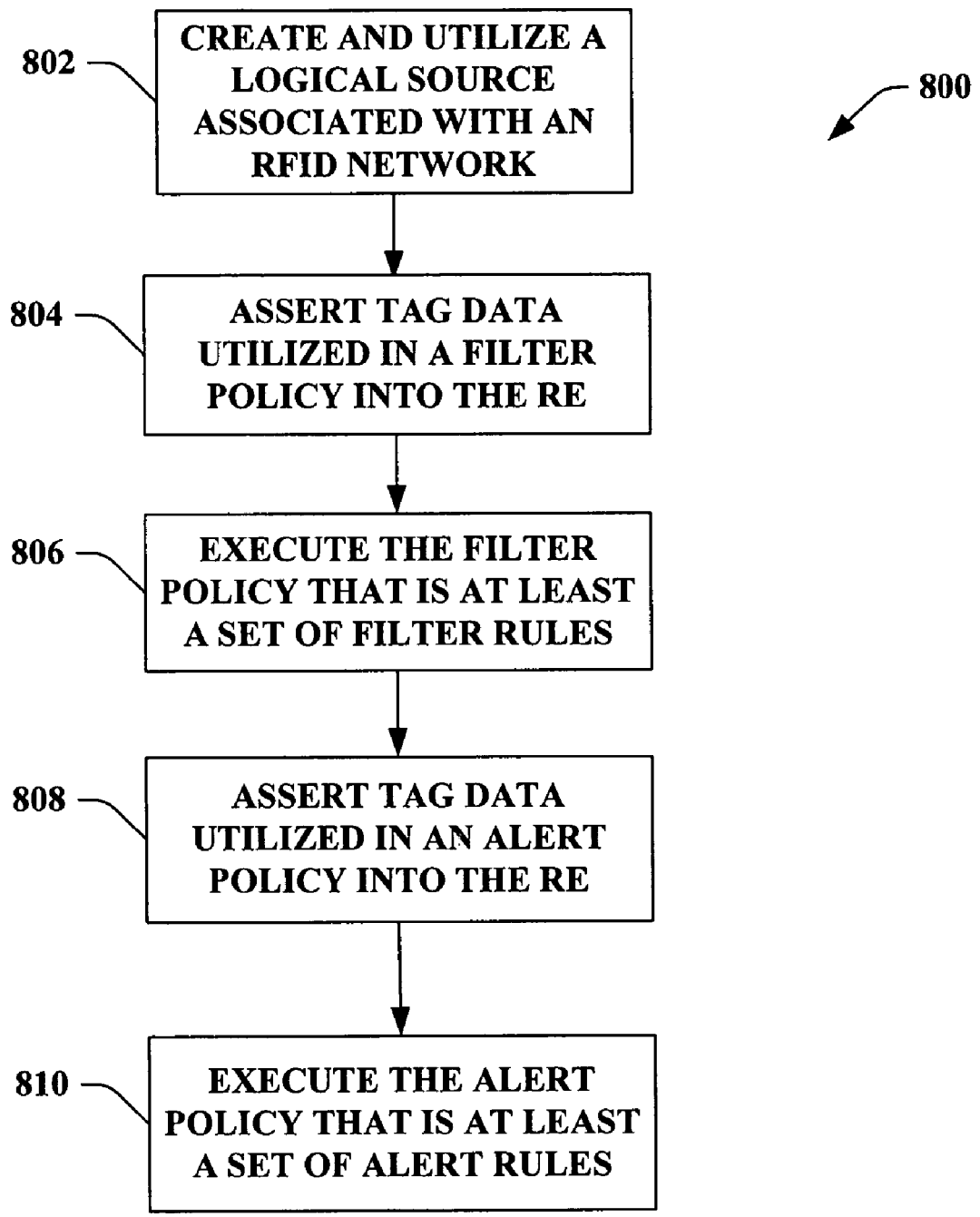
FIG. 8 illustrates an exemplary methodology for utilizing rules for declarative event policies with a rules engine related to an RFID network.
Figure 9:
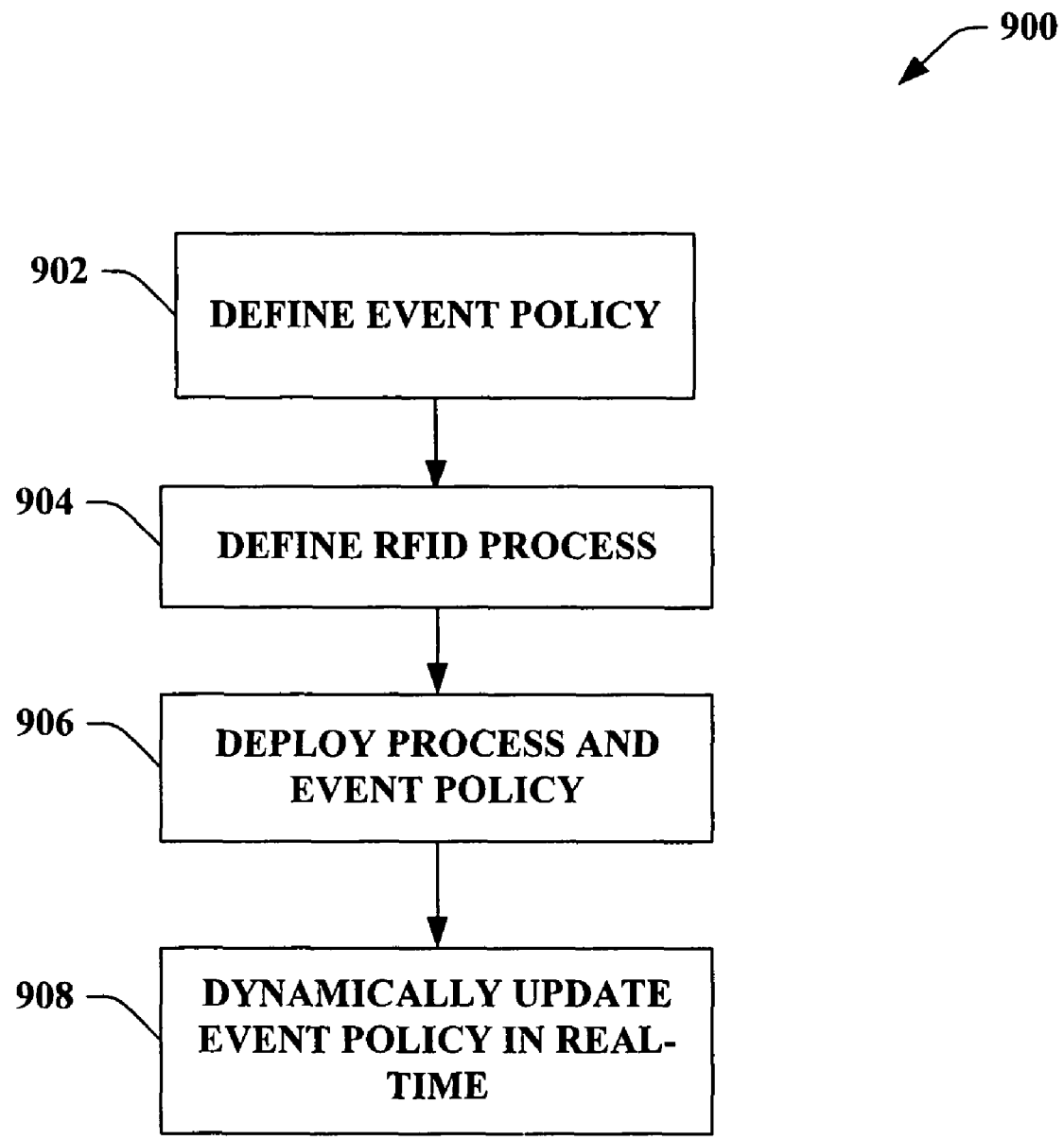
FIG. 9 illustrates an exemplary methodology that facilitates creating and/or deploying a filter and/or an alert.
Figure 10:
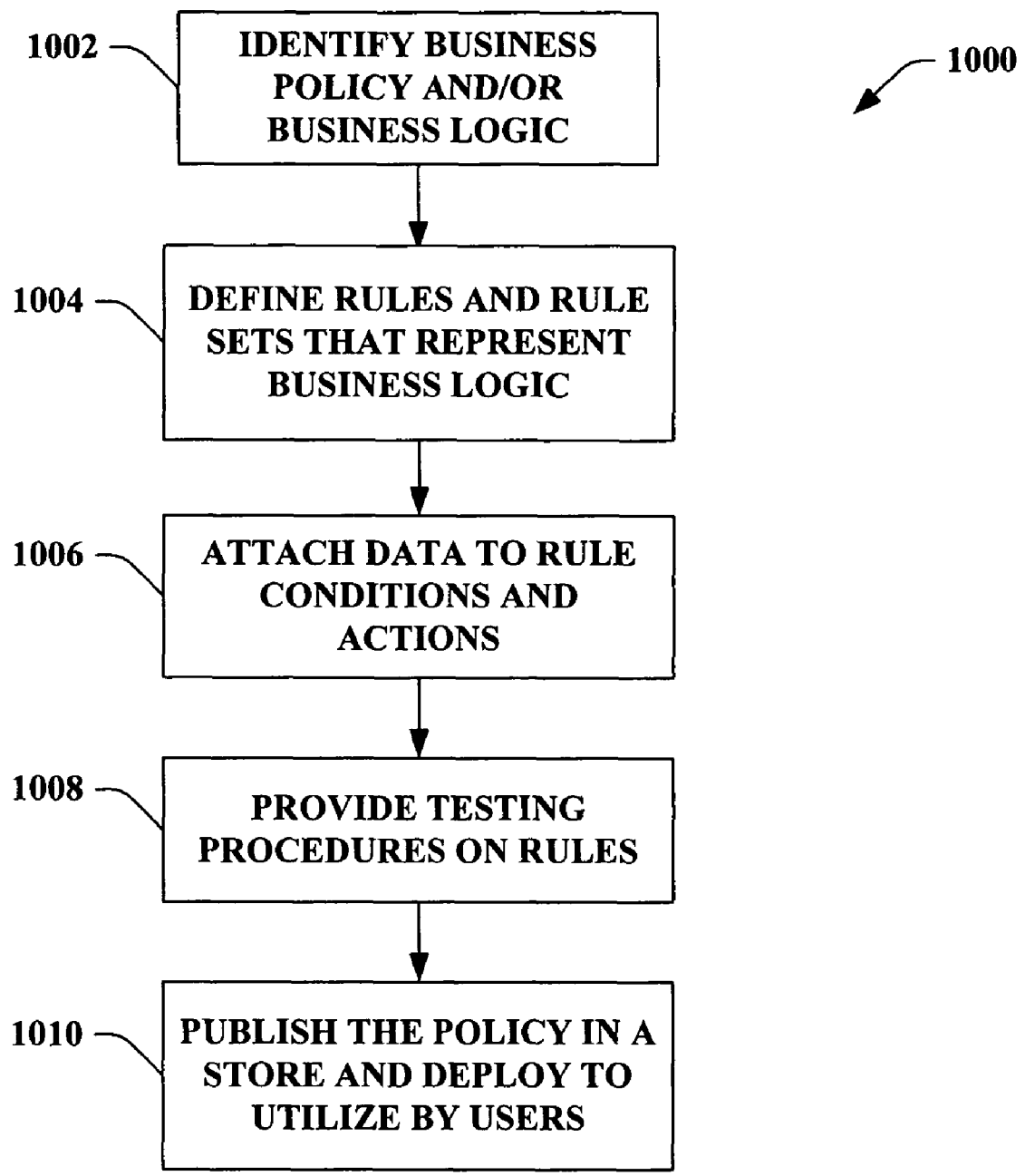
FIG. 10 illustrates an exemplary methodology for creating a rule utilized by a rules engine associated with an RFID network.

FIGS. 8-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 8 illustrates a methodology 800 for utilizing rules for declarative event policies with a rules engine related to an RFID network. At reference numeral 802, a logical source can be created and utilized, wherein the logical source can be associated with an RFID network. The logical source can be a grouping of device collections, at least one filter policy, at least one alert policy, and/or at least one event handler. The device collection can be a logical object that represents the physical device collections within the RFID network. Moreover, the event handler can handle platform and/or RFID network events and implement custom logic. The declarative event policy (e.g., filtering and/or alerting) can be specified as declarative rule based policies that can be used to evaluate conditions and drop tag data and/or execute alerts.

At reference numeral 804, tag data is asserted and utilized in the filter policy into the rules engine (RE). For instance, the tag list event can be asserted with additional facts utilized in the filter policy into the RE. At reference numeral 806, the filter policy is executed, wherein the filter policy can be a set of filter rules. At reference numeral 808, tag data is asserted and utilized in an alert policy into the RE. In other words, the tag list event and additional facts used in the alert policy are asserted into the RE. At reference numeral 810, the alert policy is executed, wherein the alert policy can be a set of alert rules.

FIG. 9 illustrates a methodology 900 that facilitates creating and/or deploying a filter and/or an alert. At reference numeral 902, a declarative event policy (e.g., consisting of one or more logical rules that are grouped together to perform in memory filtering, alerting, deduction or inferences based on events and data, and/or transformation of RFID events into higher order events for consuming business processes) such as, but not limited to, a filter and/or alert, can be defined. The declarative alert policy defined can be versioned such that changes and/or updates can be signified accordingly. Once defined, such event policies can be published. At reference numeral 904, an RFID process can be defined, for instance, by a user. The RFID process can be defined per the RFID programming model, wherein the event policies can be associated with the process. For example, during runtime, the required facts (e.g., all objects used in condition and action evaluation) utilized in the policy evaluation can be asserted and the policy can be executed (e.g., optionally with tracking options). It is to be appreciated that the declarative event policy execution can happen in sequence (e.g., filter polices can be executed initially with raw tag data streams as facts and the resulting tag data streams that are allowed through the filter policies are asserted as facts for the alert policies configured. At reference numeral 906, the process and polices (e.g., event policies) can be deployed. At reference numeral 908, the declarative events (e.g., policies) can be dynamically updated in real-time. In other words, the policies can be dynamically updated at anytime with the new event policy logic without having to start and/or stop the RFID process utilizing such policies.

FIG. 10 illustrates a methodology 1000 for creating a rule utilized by a rules engine associated with an RFID network. At reference numeral 1002, a business policy and/or business logic can be identified. For example, a new business policy can be identified and/or the business logic can be extracted from an existing application. The data that is to be utilized by the business logic (e.g., data that is modified frequently) can also be identified. At reference numeral 1004, rules and rule sets can be defined to represent the business logic. Defining the rule sets can be by at least one of the following: 1) utilizing composer tools; 2) writing rule markup language files (RML); and 3) programmatically utilizing the object model of the RFID network. At reference numeral 1006, the identified data can be attached to the rule conditions and actions, wherein such data can be, for instance, object, XML document fields and attributes, and database table columns). By implementing the above, the objects are bound to rule conditions and actions utilizing any of the rule set definitions (e.g., 1) utilizing composer tools; 2) writing rule markup language files (RML); and 3) programmatically utilizing the object model of the RFID network).

At reference numeral 1008, testing procedures can be utilized with the rules and/or rule sets. For example, inside a rule-based application, an instance of a policy tester class can be created providing the name of the rule set created as a constructor parameter. The policy tester class can utilize the fact retriever associated with the rule set defined if present. The instances of the objects bound to rule conditions and actions can be added to the policy tester object class instance, wherein such policy can be executed. The results of such rule execution (e.g., the facts updated during rule execution) can be utilized in the business application. At reference numeral 1010, the policy can be published in a store and deployed.

Figure 11:
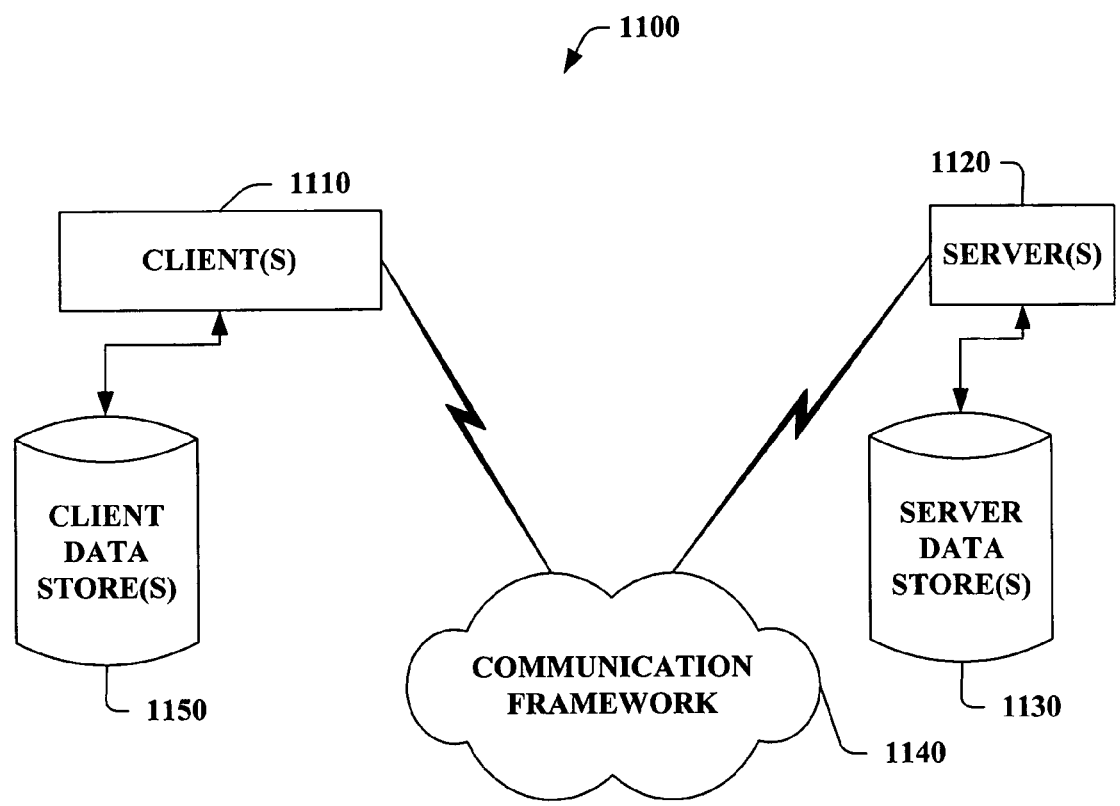
FIG. 11 illustrates an exemplary networking environment, wherein the novel aspects of the claimed subject matter can be employed.
Figure 12:
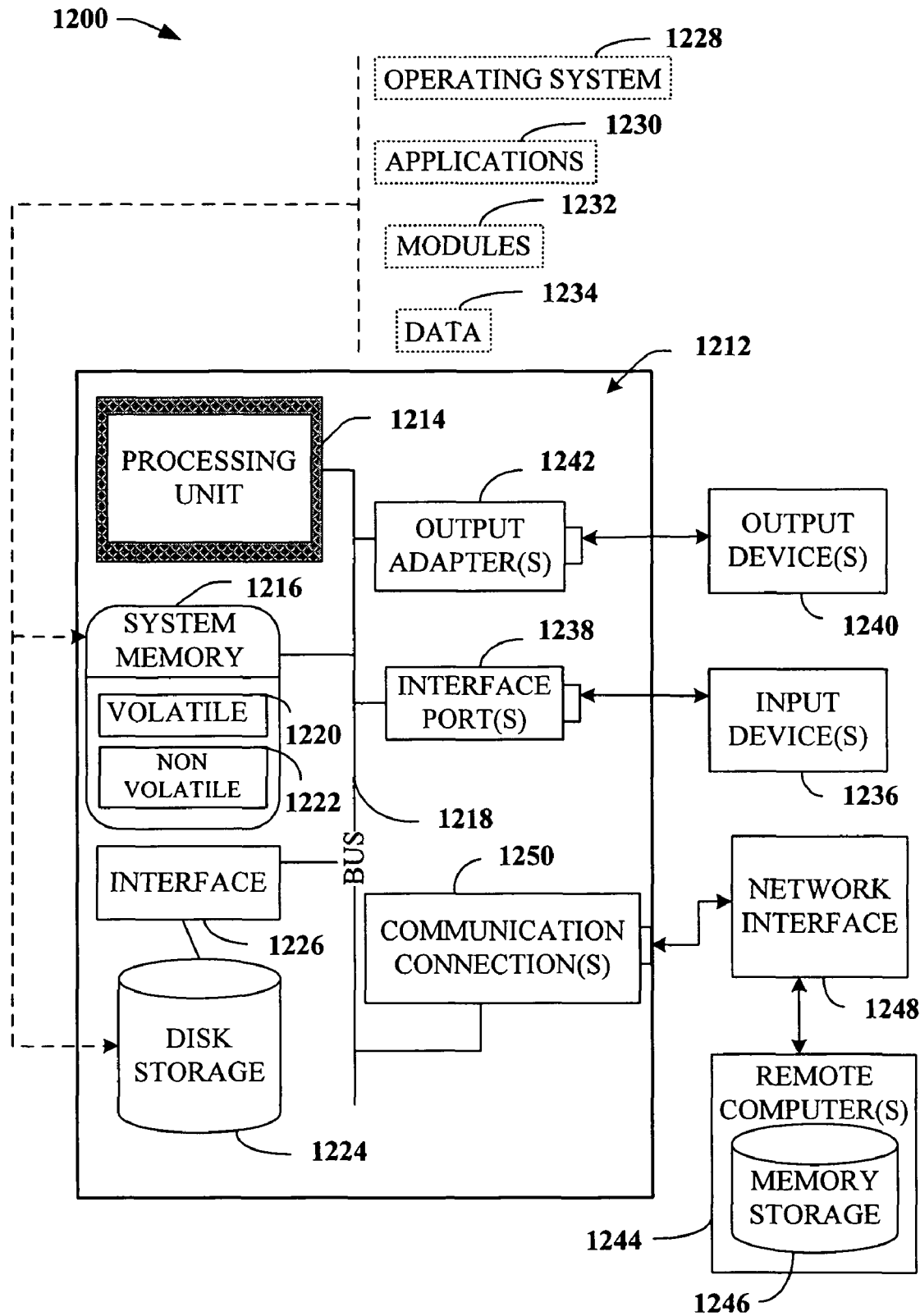
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented method that facilitates utilizing rule-based technology with a radio frequency identification (RFID) network, comprising:

receiving a dynamic update in real time of a declarative event policy, the declarative event policy comprising one or more logical rules that are grouped together to perform in memory filtering, alerting, deduction and inferences based upon events and data associated with RFID events;

creating a logical source associated with the RFID network, the logical source providing tag data comprising an identification (ID), a type, a source, a time, and a device name, the logical source comprising each of a device collection, a filter policy, an alert policy, and an event handler, the filter policy comprising removal of duplicate reads and allowing at least one combination of items, the alert policy comprising raising an alert when an RFID tag in a given range is collected, raising an alert when a first given RFID tag is collected in a first given time period, and raising an alert when a second given RFID tag is read repeatedly in a second given time period, the alert policy also comprising raising an alert when a first device within the RFID network is down, raising an alert when a second device within the RFID network comes up, raising an alert when a new device within the RFID network is discovered, wherein each alert raised comprises the ID, type, source, time, data, and device name associated with the particular RFID tag or device;

receiving RFID information from the logical source associated with the RFID network; asserting at least a portion of the tag data to be used in the filter policy into a rules engine (RE), the RE utilizing a rule component that applies rules that are contained within rule sets that adhere to a fixed format comprising event, condition, and action rules, the RE supporting predicates and conditions, wherein the rules are expressed at least in part using a domain specific nomenclature and wherein the rules are interpreted at least in part by a vocabulary component which maps one or more domain specific terms in the domain specific nomenclature to one or more underlying implementing technologies;

the RE inferring states and generating a probability distribution over the states based upon a captured set of RFID observations, the inferred states identifying a specific context and action;

the RE accepting and deploying an updated rule set in real-time, wherein deploying the updated rule set is accomplished without a restart of the RE;

executing the filter policy based at least in part upon the tag data provided by the logical source; and executing the alert policy based at least in part upon the tag data provided by the logical source, wherein a set of alert actions associated with the alert policy comprises one or more of sending email, sending SMS, sending a page, and creating a log.

2. The method of claim 1, further comprising:
defining at least one second event policy;
defining an RFID process;
deploying each of the RFID process, and the second event policy; and
dynamically updating at least one second event policy in real-time without restarting the rules engine.

3. The method of claim 1, further comprising:
identifying at least one of a business policy related to a new application and a business logic related to an existing application;
defining a rule with a rule set that represents the business logic;
attaching tag data to at least one of a condition and an action related to the rule;
testing the rule; and
publishing the business policy in a store to deploy.

4. A computer program product comprising physical memory having stored thereon computer-executable instructions which, when executed upon one or more computer processors, causes the one or more processors to perform the method of claim 1.

* * * * *